United States Patent [19]

Deegener et al.

[11] Patent Number: 5,092,655
[45] Date of Patent: Mar. 3, 1992

[54] VEHICLE SEAT, ESPECIALLY AN AIR PASSENGER SEAT

[75] Inventors: Elmar Deegener, Stelzenberg; Frank Starke, Schwäbisch Hall; Volker Scháfer, Münchweiler/Alsenz, all of Fed. Rep. of Germany

[73] Assignee: Keiper Recaro GmbH & Co., Fed. Rep. of Germany

[21] Appl. No.: 533,842

[22] Filed: Jun. 6, 1990

[30] Foreign Application Priority Data

Jun. 7, 1989 [DE] Fed. Rep. of Germany ....... 3918502

[51] Int. Cl.⁵ .............................................. A47C 7/02
[52] U.S. Cl. .................................... 297/459; 297/458; 297/216
[58] Field of Search ......... 297/458, 459, 460, DIG. 2, 297/452, 216

[56] References Cited

U.S. PATENT DOCUMENTS

| | | | |
|---|---|---|---|
| 2,004,237 | 6/1935 | Costello | 297/459 X |
| 2,970,638 | 2/1961 | Halter | 297/460 X |
| 3,177,036 | 4/1965 | Halter | 297/459 X |
| 3,740,096 | 6/1973 | Bridger | 297/459 |
| 4,726,624 | 2/1988 | Jay | 297/459 |
| 4,840,430 | 6/1989 | Shimada | 297/459 X |

FOREIGN PATENT DOCUMENTS

| | | | |
|---|---|---|---|
| 2468478 | 5/1981 | France | 297/459 |
| 2201088 | 8/1988 | United Kingdom | 297/459 |

Primary Examiner—Peter A. Aschenbrenner
Attorney, Agent, or Firm—Wigman & Cohen

[57] ABSTRACT

The seat cushion of a vehicle seat, especially of an air passenger seat, lies on a cushion support that is supported by parts of the seat frame. This cushion support lies lower in the area which supports the sitting part of the seat than in the area situated in front of this. The cushion support is designed as a shell (6), which forms a depression (13,14) in the region which supports the sitting part of the seat, said depression being matched to the shape of the human seat.

14 Claims, 2 Drawing Sheets

VEHICLE SEAT, ESPECIALLY AN AIR PASSENGER SEAT

BACKGROUND OF THE INVENTION

1. Field of the Invention

The invention relates to a vehicle seat, especially an air passenger seat, whose seat cushion lies on a cushion support that is supported by parts of the seat frame. The cushion support lies deeper in the area which supports the sitting part of the seat than in the area which supports the upper legs.

2. Description of the Prior Art

In a known vehicle seat of the aforementioned type (U.S. Pat. No. 2,833,339), the cushion support extends in the transverse direction of the seat across two adjoining seats, is equipped with longitudinal slots that extend the longitudinal direction of the seat which are at equal distances next to one another in a direction perpendicular to the seat. These divide the cushion support into flexible, adjoining strips, which are rigidly connected to the front transverse strut, and which are connected by springs to the rear transverse strut. The area which supports the sitting parts of the seat is slightly concave. The area which supports the upper legs is slightly convex. The thickness of the seat cushion in the concave area is only slightly less than in the convex area.

OBJECTS AND SUMMARY OF THE INVENTION

It is therefore an object of this invention to provide a vehicle seat, especially an air passenger seat, which can better fulfill the requirements of conventional seats and have the smallest possible space requirement.

Briefly stated, in the present invention a shell which forms the cushion support for the seat cushion includes a depression which conforms to the human seat, in the sitting area of the seat. As a result, the sitter's weight is well distributed, minimizing the height of the seat cushion, and providing a space-saving mode of construction. Another advantage of providing a seat construction having a depression resides in the formation of a transition from the depression to the region in front of it which can be used as a ramp. In case of severe deceleration, the transition area prevents so-called "submarining," where the sitter slides forward and under the lap belt. Another important advantage of the shell of the present invention is that, as a separate part, it greatly simplifies adapting the seat width to different requirements. By this construction, one needs only to select a shell corresponding to the desired seat width. Since the shell which is being used as a cushion support is designed to have a depression in the region which supports the sitter it is readily easy to make a differentiated selection of its properties to satisfy different requirements. It is also possible to use different cushion materials instead of or in addition to different seat-cushion thicknesses, so as to adapt the properties of the seat cushion to the different requirements optimally in all regions. In a preferred arrangement, the ramp at the transition from the depression to the higher-lying part of the shell has a concave side zone at both sides of a convex middle zone.

Additionally, a spring suspension, e.g. leaf type, rubber sheet, zig-zag springs located side by side, can be provided with the seat cushion. Such a spring suspension, however, can generally be considered only in the region which supports the sitting part of the seat. It can be positioned between the top side and the underside of the seat cushion.

According to the present invention, the rear edge zone of the shell is designed as the placement surface for placing a transverse strut. Such a placement surface also facilitates assembly, since it properly positions the shell with respect to the rear transverse strut. The side edges of the shell preferably have a profile matched to the side struts of the seat frame, and, in the case of an air passenger seat, possibly also matched to the seat divider, so that these side edges can readily be connected to these parts.

BRIEF DESCRIPTION OF THE DRAWINGS

The invention is explained in more detail below by way of an embodiment shown in the drawings wherein.

DETAILED DESCRIPTION OF THE PREFERRED EMBODIMENT

Figure 1:
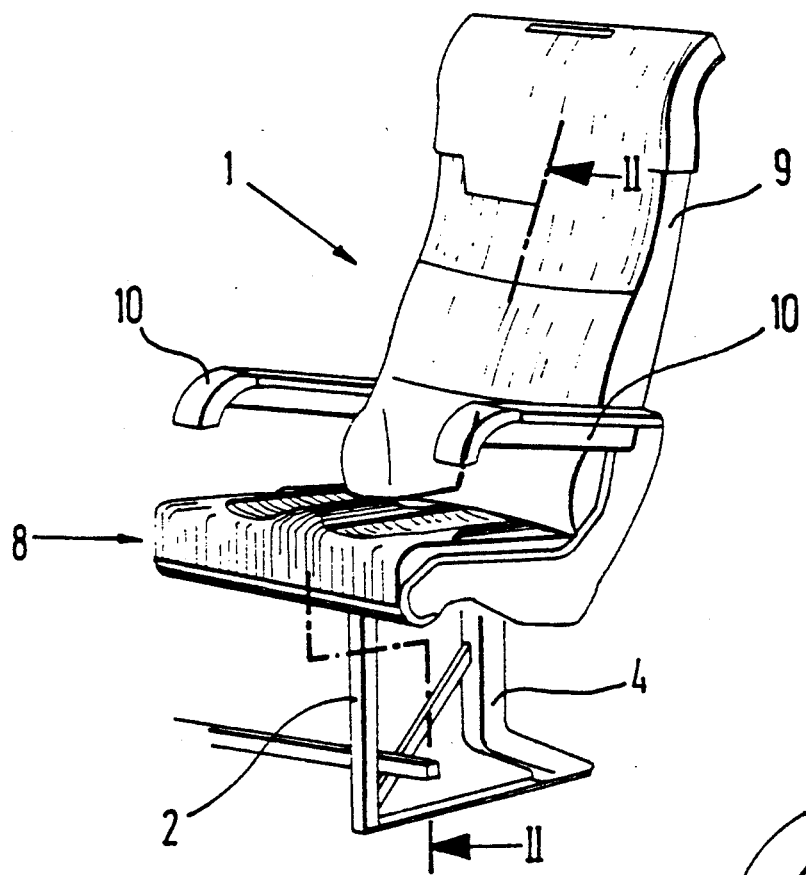
FIG. 1 is a perspective view of the vehicle seat construction according to the present invention.
Figure 2:
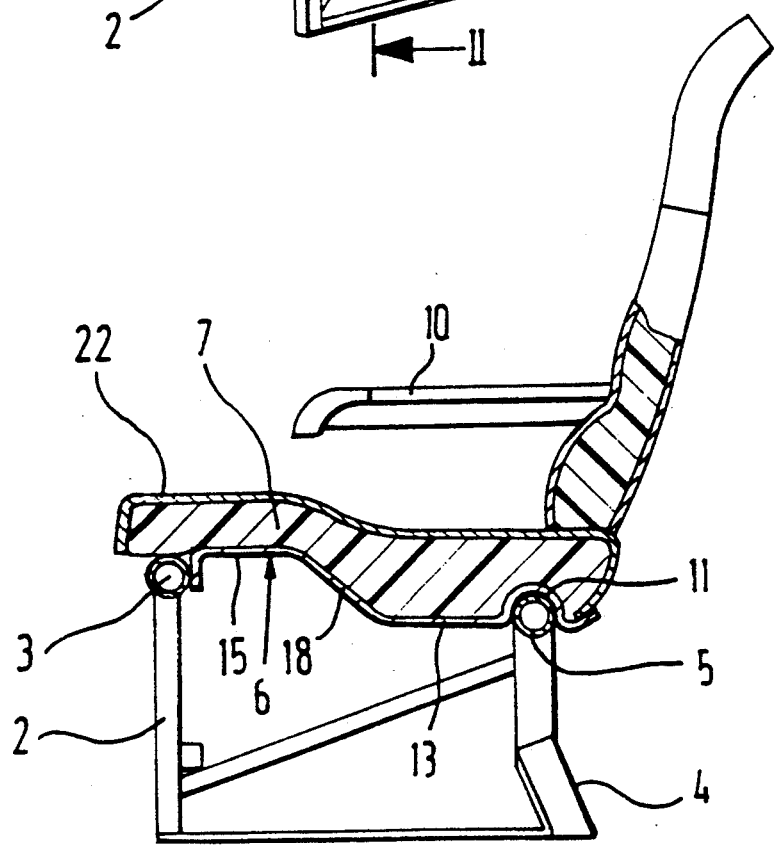
FIG. 2 is an elevational view, in section, taken along line II—II of FIG. 1.

Referring now to the drawings wherein like numerals indicate like elements throughout the several views there is shown in FIGS. 1 and 2 an air passenger seat 1 made according to the present invention. Passenger seat 1 has a front transverse strut 3, designed as a tube, and supported by the front foot 2, as well as a rear transverse strut 5, extending parallel to the front struts. Rear strut 5 is supported by the rear foot 4, and is also a tubular shape. The rear strut 5 is situated somewhat lower than the front strut 3.

As seen in FIG. 2, shell 6, made preferably of aluminum sheet metal, is placed on the rear transverse strut 5, and is rigidly connected to the two transverse struts 3 and 5. This shell 6 forms the support for the seat cushion 7 of the air passenger seat 1. The two side edges of the shell 6 lie on separate seat dividers and are connected to separate seat dividers, which are solidly connected to the two transverse struts 3 and 5, and which are used to connect the back rest 9 to the seat part 8, and to support an armrest 10.

Figure 3:
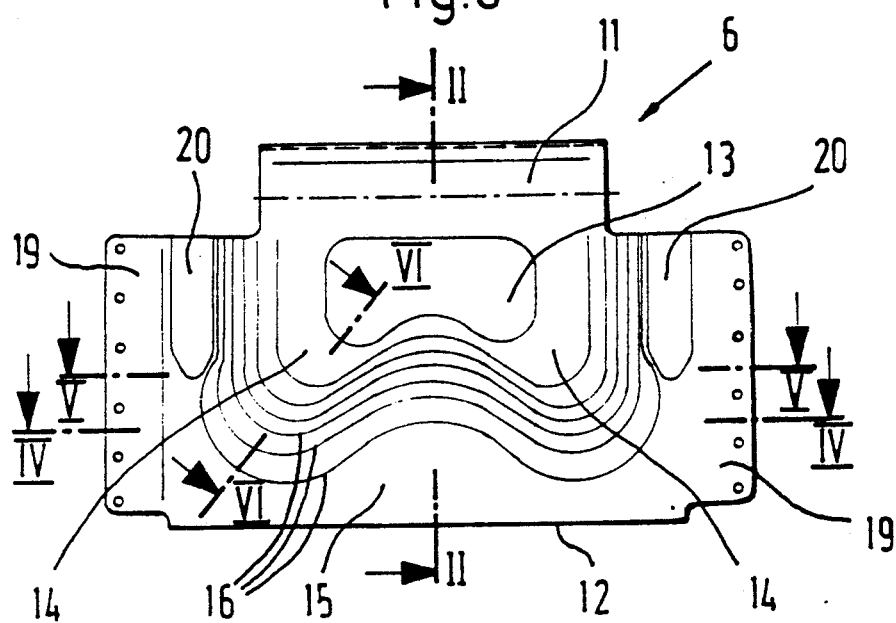
FIG. 3 is a plan view of the cushion support of the vehicle seat.

As shown in FIGS. 2 and 3, rear edge zone 11 of the shell 6 is narrower than the remaining part of the shell 6. It forms a trough open towards the bottom, whose curvature is matched to the curvature of the rear transverse strut 5. When the rear edge zone 11 is placed on the rear transverse strut 5, the shell 6 is therefore positioned correctly, which facilitates assembly. Furthermore, the trough shape improves the connection between the shell 6 and the rear transverse strut 5. The front edge zone 12, as FIG. 2 shows, is angled downwards, and lies behind the front transverse strut 3. As FIG. 3 shows, the front edge zone 12 is also somewhat narrower, on account of the seat dividers, than the part of the shell 6 which lies between it and the rear edge zone 11.

Figure 4:
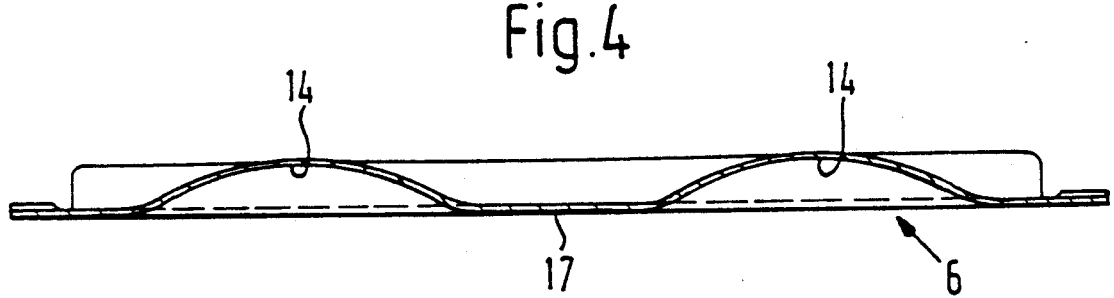
FIG. 4 is an enlarged section taken along line IV—IV of FIG. 3.
Figure 5:
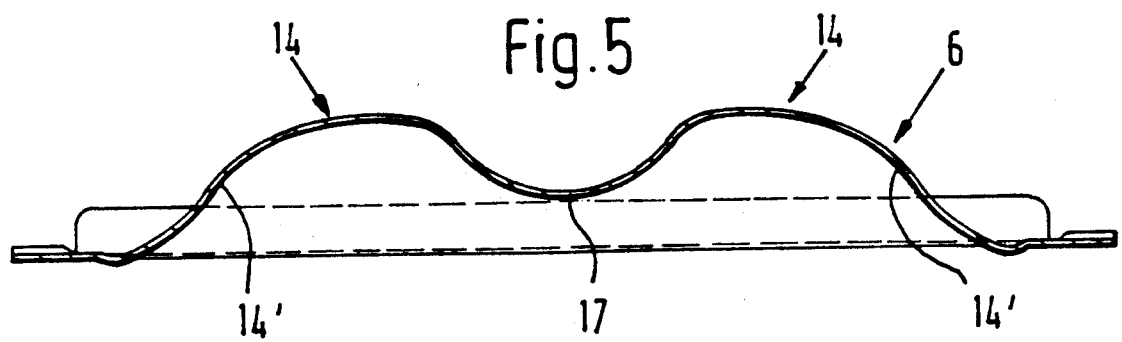
FIG. 5 is an enlarged section taken along line V—V of FIG. 3.
Figure 6:
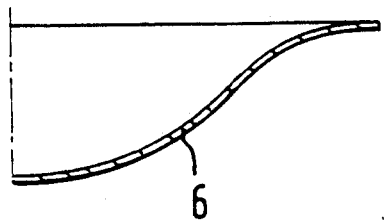
FIG. 6 is an enlarged section taken along line VI—VI of FIG. 3.

In the area which supports the sitting part of the seat user, the shell 6 has a depression 13 which matches the shape of the human seat, and which has a depth of 60 mm at its lowest point. Two trough-shaped run-outs 14 of the depression 13 extend towards the two front corner regions of the shell 6. The depression 13 gradually rises to the level of the front region 15, which adjoins the front edge zone 12. The shape of the depression 13 and the trough-like run-outs 14 are shown in FIG. 3 by means of the contour lines 16. FIGS. 4 through 6 also show that the region 17, raised above the trough-like run-outs 14, is situated between them. As is clear from the height differences that are shown in FIG. 3 by means of the contour lines 16, the lateral border in the rear part of the depression 13 has a similar pattern as the outer border 14' of the two trough-like run-outs 14, the border 14' being shown in FIG. 5. The transition from the depression 13 and from the two trough-like run-outs 14, to the front region 15, forms a ramp 18 which rises at a slant forwards and upwards, as FIG. 2 shows. In case of severe deceleration, the seat of the seat user is pressed against this ramp. As a result, so-called submarining, that is slipping through and down under the seat belt, is reliably prevented. Preferably, the ramp 18 has an angle of about 40 degrees with respect to the horizontal.

The two lateral edge zones 19 of the shell 6 are formed flat in the embodiment, since they are placed on the flat contact surface of the seat dividers and are connected to these. Bead-like elevations 20, protruding upwards, reinforce the shell between the depression and the two lateral edge zones 19 in their rear half.

As shown in FIG. 2, the seat cushion 7 is an all-foam, formed body, whose lower surface conforms to the shape of the shell 6. The thickness of the seat cushion 7 above the depression 13 is much greater than above the front region 15, which lies in front of it. Consequently, when the seat cushion 7 is unstressed, its essentially flat top side lies only slightly lower above the depression 13 than above the region 15 in front of this. As a result, the transition appears only as a very slight ramp. The thickness of the seat cushion 7 is here chosen so that it optimally fulfills the different requirements in the region of the depression 13 and in the region 15 lying before it, and at the same time reduces the space requirement to a minimum. A suitable covering 22 for the seat cushion 7 is provided.

A spring suspension 7a, of the leaf type, of rubber sheet, zig-zag springs located side by side, is provided with the seat cushion 7. Spring suspension 7a is shown as an intermediate region between two cushion sections in FIG. 2. Such a spring suspension 7a is located only in the region which supports the sitting part of the seat 8. It is positioned between the top side and the underside of the seat cushion 7.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat, especially an air passenger seat, comprising: a cushion support contoured for receiving a cushion, said cushion support carried by a seat frame; said cushion support formed as a shell having a depression conforming to the shape of the human seat in the region which supports the sitting part of the seat;
    said shell depression comprises two trough-like run-outs which extend in the direction towards one or the other front corner of the shell, said run-outs gradually rise to the front of the seat thereby forming ramps at the front end of said run-outs; and
    said shell includes a ramp which rises from the depression to that region of the shell which lies in front of the depression, said shell ramp and said run-out ramps being effective to prevent sliding through under the lap belt in case of a crash.

2. The vehicle seat of claim 1, wherein said ramp has a concave side zone at both sides of a convex middle zone.

3. The vehicle seat of claim 1, including a seat cushion which is thicker in the region overlying the shell depression than in the region which lies before it.

4. The vehicle seat of claim 2, including a seat cushion which is thicker in the region overlying the shell depression than in the region which lies before it.

5. The vehicle seat of claim 3, including a leaf spring suspension in a partial region of the seat cushion between its top side and its bottom side.

6. The vehicle seat of claim 4, including a leaf spring suspension in a partial region of the seat cushion between its top side and its bottom side.

7. The vehicle seat of claim 3, wherein the seat cushion is an all-foam, formed body.

8. The vehicle seat of claim 4, wherein the seat cushion is an all-foam, formed body.

9. The vehicle seat of claim 7, wherein the properties of the seat cushion are chosen to be different in regions that are subject to different stresses.

10. The vehicle seat of claim 8, wherein the properties of the seat cushion are chosen to be different in regions that are subject to different stresses.

11. The vehicle seat of claim 1, further including a tubular transverse strut on the rear of said frame, the rear edge zone of the shell including means for placement on said rear transverse strut of the seat frame.

12. The vehicle seat of claim 11, wherein said shell rear edge zone includes a trough, open downwards, with a radius of curvature that conforms to the outside diameter of the tubular rear transverse strut whereby said shell is securely supported by said seat frame transverse tubular strut.

13. The vehicle seat of claim 11, including a seat cushion which is thicker in the region overlying the shell depression than in the region which lies before it.

14. The vehicle seat of claim 12, including a seat cushion which is thicker in the region overlying the shell depression than in the region which lies before it.

* * * * *